US005798861A

United States Patent [19]

Doat

[11] Patent Number: 5,798,861

[45] Date of Patent: Aug. 25, 1998

[54] INFORMATION PRESENTATION DEVICE USING A SHEET OF ROLLED MATERIAL

[76] Inventor: Guy Doat, 18 rue Remont, 78000 Versailles, France

[21] Appl. No.: 750,807

[22] PCT Filed: May 14, 1996

[86] PCT No.: PCT/FR96/00727

§ 371 Date: Dec. 24, 1996

§ 102(e) Date: Dec. 24, 1996

[87] PCT Pub. No.: WO96/36958

PCT Pub. Date: Nov. 21, 1996

[30] Foreign Application Priority Data

May 17, 1995 [FR] France ..................................... 95 06074

[51] Int. Cl.[6] ..................................... G03B 21/56

[52] U.S. Cl. ..................................... 359/461; 359/443

[58] Field of Search ..................................... 359/443, 461

[56] References Cited

U.S. PATENT DOCUMENTS

| | | | |
|---|---|---|---|
| D. 366,055 | 1/1996 | Matsunaga et al. | D16/241 |
| 4,169,658 | 10/1979 | Brown | 350/118 |
| 4,416,511 | 11/1983 | Weinberg | 350/117 |
| 5,274,499 | 12/1993 | Shopp | 359/461 |
| 5,581,401 | 12/1996 | Takamoto et al. | 359/443 |

FOREIGN PATENT DOCUMENTS

| | | |
|---|---|---|
| 0635753 | 1/1995 | European Pat. Off. . |
| 2608302 | 6/1988 | France . |
| 3447897 | 7/1986 | Germany . |

*Primary Examiner*—Daniel P. Malley

*Attorney, Agent, or Firm*—Kerkam, Stowell, Kondracki & Clarke, P.C.

[57] ABSTRACT

The invention relates to an information presentation device which includes a sheet of material rolled onto a drum, with the drum being contained in case. The case includes an area for housing at least one element of a pole, and the housing area also has an opening for loading and unloading the pole elements, which opening has a profile substantially greater than that of a pole element in a longitudinal plane, so as to allow the passage of such an element, and the housing area is disposed relative to the case in such a way that its opening adjoins a slot for the passage of the sheet and such that the slender rigid piece connected to the upper edge of said sheet, in the rolled position of said sheet, at least partially closes the opening of the housing area, thus preventing any unloading of the elements of the pole contained therein.

9 Claims, 3 Drawing Sheets

FIG. 3
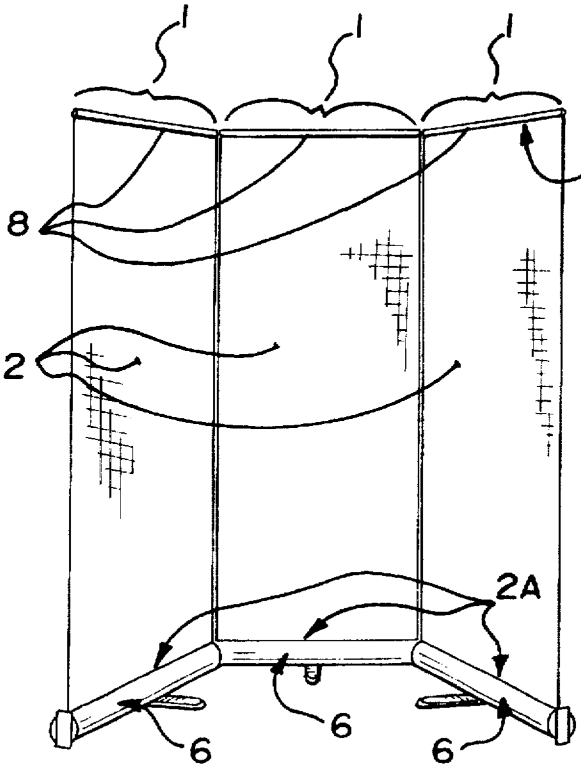
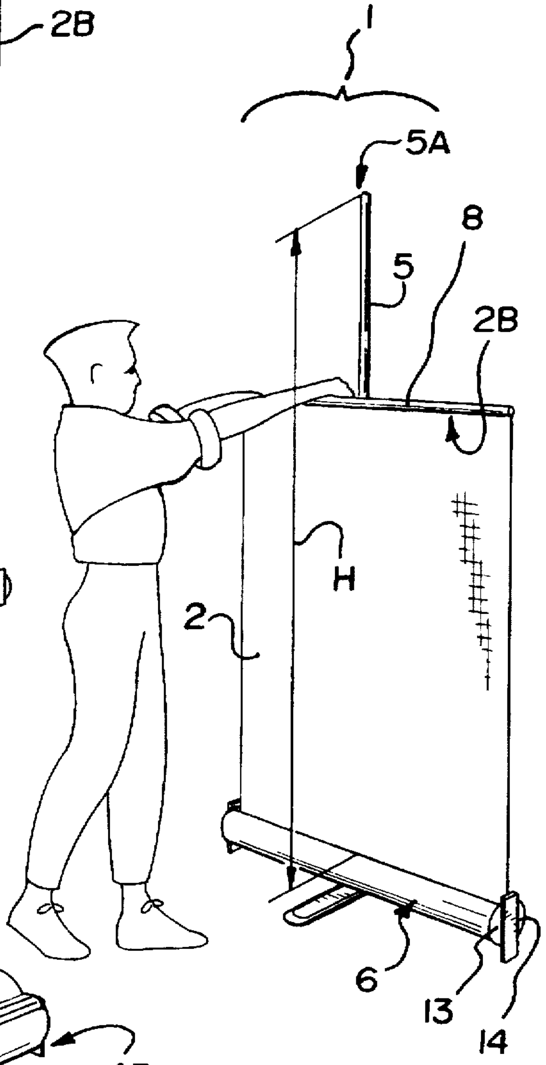
FIG. 2
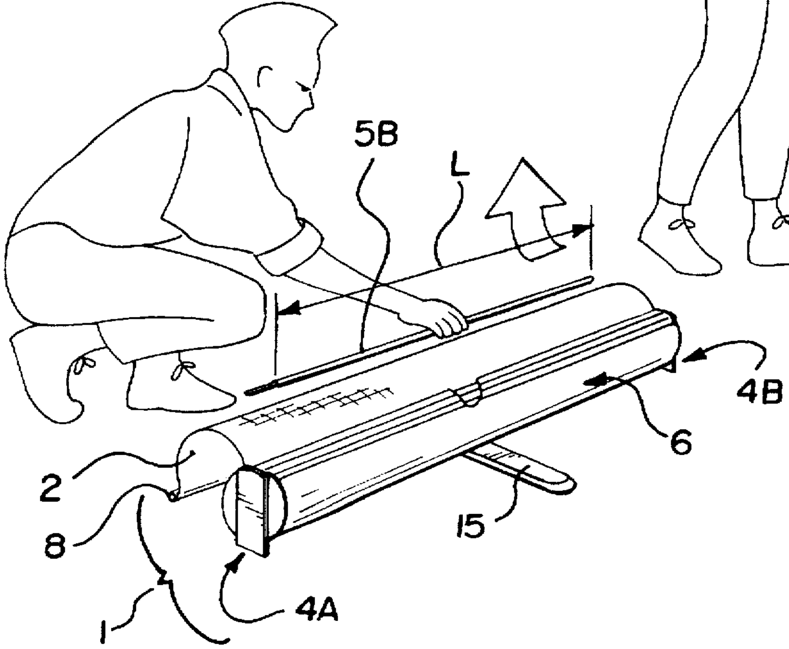
FIG. 1

INFORMATION PRESENTATION DEVICE USING A SHEET OF ROLLED MATERIAL

BACKGROUND OF THE INVENTION

1. Field of the Invention

The invention relates to an information presentation device of the type comprising a sheet of material rolled onto a drum mounted on a base and a demountable pole intended to be raised up from this base for holding the sheet taut between the drum and a point on the pole at a distance from the base, such as its upper end.

The term sheet of material rolled on a drum is intended to designate both an information medium and a screen which allows writing.

The term demountable pole designates both a pole constituted by telescopic elements and a pole constituted by elements which can be assembled end to end.

SUMMARY OF THE INVENTION

A presentation device of this type is intended to be transported from one information presentation site to another.

Apart from the fact that it must be light and sturdy, that is, able to withstand the dangers of transport such as shock or being disassembled and reassembled repeatedly without breaking, a device of this type must also be practical, which means that its assembly and disassembly must constrain the operator to the smallest possible number of manipulations.

The object of the device of the invention is precisely to obtain a device which combines lightness and sturdiness, and is also practical.

To this end, the subject of the invention is an information presentation device of the type comprising a sheet of material rolled onto a drum supported at least indirectly by a base, and a demountable pole intended to be raised up from this base for holding the sheet taut between the drum and a point on the pole at a distance from the base, such as its upper end, the drum being contained in a case, and on the one hand guided in rotation around its longitudinal axis relative to the base, and on the other hand elastically stressed by a means for this purpose, in a predetermined direction of rotation, so as to maintain the sheet in traction so that it can be rolled inside the case through a longitudinal slot which it passes through in order to be unrolled, which sheet comprises, in addition to an edge called the lower edge which is secured at least indirectly to the drum, an opposite edge called the upper edge, along which extends a slender rigid piece like a rod which, being particularly rectilinear and having a predetermined cross-section, is intended to be connected to the pole at right angles, specifically at a point called the suspension point, so as to allow the sheet to be held taut between this point and the drum, the pole itself being the demountable type, meaning that in the unassembled state, it comprises at least one element which has a length equal to a fraction of the height of the pole in the raised state, this device being characterized in that:

- the case includes a means for housing at least one pole element,
- this housing means has an opening for loading and unloading the pole elements, which opening has a profile substantially greater than that of one pole element in a longitudinal plane, so as to allow the passage of such a pole element, and
- the housing means is disposed relative to the case in such a way that its opening adjoins the slot for the passage of the sheet and that the slender rigid piece connected to the upper edge of this sheet, in the rolled position of the sheet, at least partially closes the opening of the housing means, thus preventing any unloading of the pole elements it contains.

BRIEF DESCRIPTION OF THE DRAWINGS

The invention may be clearly understood with the aid of the description below, given as a non-limiting example, in reference to the appended drawings which represent:

FIGS. 1 through 3: views in perspective of a device in the process of being installed.

DETAILED DESCRIPTION OF THE PREFERRED EMBODIMENT

Figure 4:
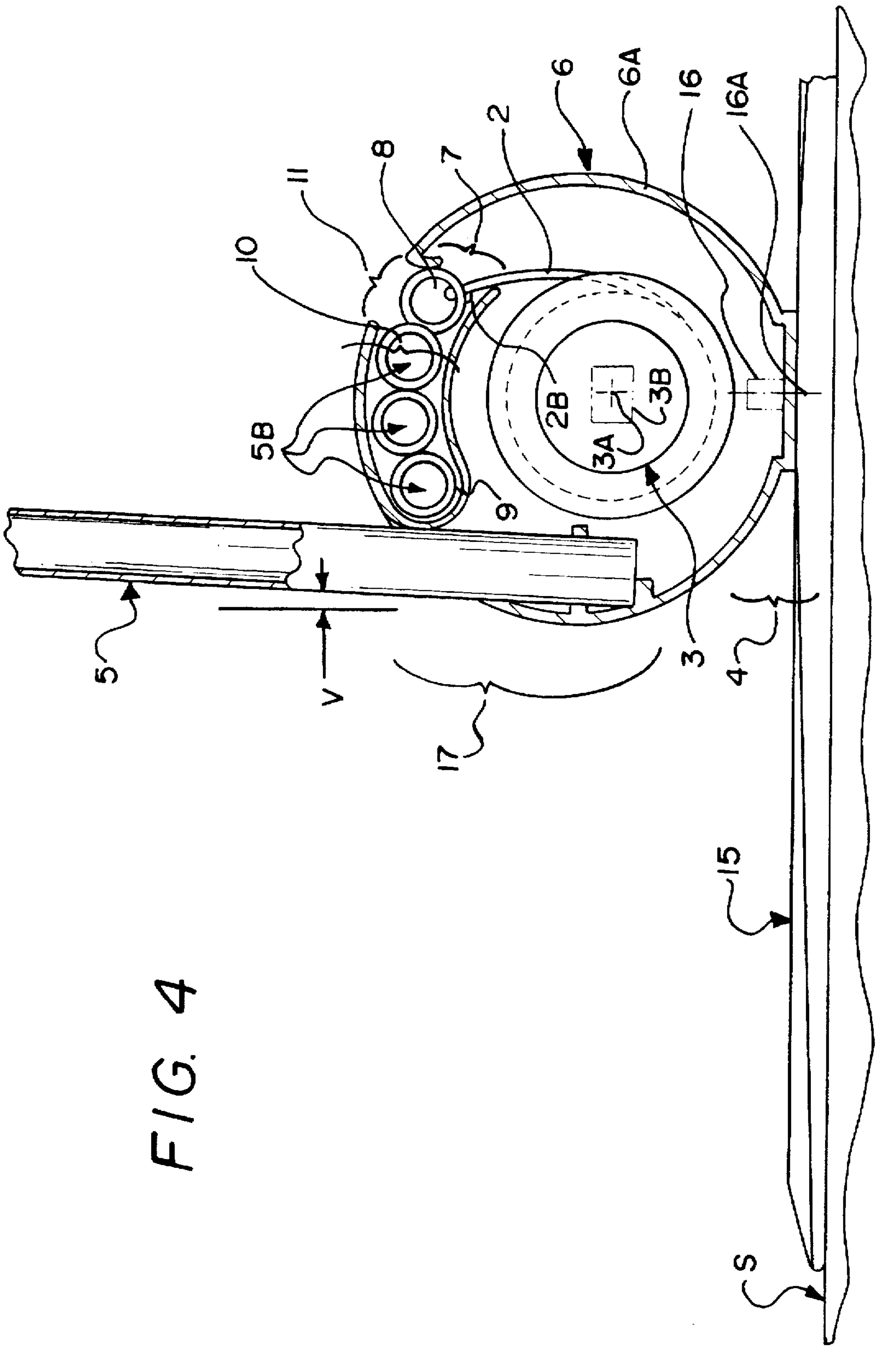
FIG. 4: a view in cross-section of a device according to the invention.
Figure 5:
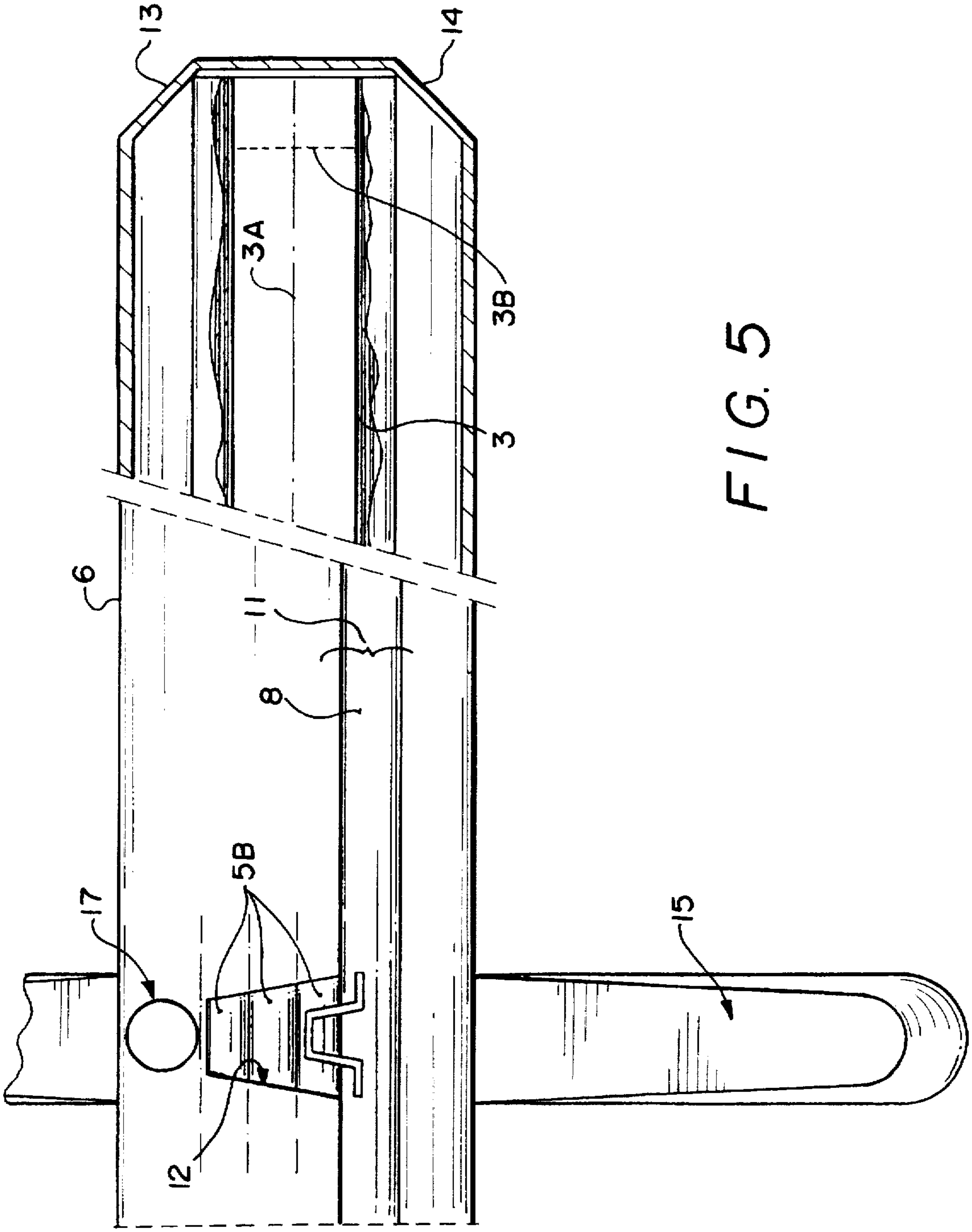
FIG. 5: a partially abbreviated view of a device according to the invention.

Refer now to the drawings, which show a device 1 for presenting information (not represented), of the type comprising a sheet 2 of material rolled onto a drum 3 supported at least indirectly by a base 4, and a demountable pole 5 intended to be raised up from this base 4 for holding the sheet 2 taut between the drum 3 and a point 5A on the pole 5 at a distance from the base 4, such as its upper end 5A.

The base 4 is intended to support the device on a support S, such as the floor S.

Although it is not immediately apparent in the drawing, the sheet of material 2 rolled onto a drum 3 consists, for example, of a screen which allows writing.

The drum 3 is contained in a case 6, and on the one hand is guided in rotation around its longitudinal axis 3A relative to the base 4, and on the other hand is elastically stressed by a means 3B for this purpose, in a predetermined direction of rotation, so as to maintain the sheet 2 in traction so that it can be rolled inside the case through a longitudinal slot 7 which it passes through in order to be unrolled.

The case 6 is defined by a wall 6A which, in the embodiment represented, is a rotating tube.

In addition to an edge 2A called the lower edge, which is secured at least indirectly to the drum 3, the sheet 2 comprises an opposite edge 2B called the upper edge, along which extends a slender rigid piece 8 like a rod which, being particularly rectilinear and having a predetermined cross-section, is intended to be connected to the pole 5 at right angles, specifically at a point 5A called the suspension point, so as to allow the sheet 2 to be held taut between this point 5A and the drum 3.

In the rolled position of the sheet 2, the slender piece 8 connected to its upper edge 2B is supported by the wall of the case 6, at least at the level of the longitudinal slot through which the sheet 2 passes.

The pole 5 is the demountable type, meaning that in the unassembled state, it comprises at least one element 5B which has a length L equal to a fraction of the height H of this pole 5 in the raised state.

Remarkably:

- the case 6 includes a means 9 for housing at least one element 5B of the pole 5,
- this housing means 9 has an opening 10 for loading and unloading the pole elements 5B, which opening 10 has a profile substantially greater than that of one pole element 5A in a longitudinal plane, so as to allow the passage of such an element 5A of the pole 5, the housing means 9 is disposed relative to the case 6 in such a way that its opening 10 adjoins the slot 7 for the passage of the sheet 2 and that the slender rigid piece 8 connected to the upper edge of the sheet 2, in the rolled position of this sheet 2, at least partially closes the opening 10 of the housing means, thus preventing any unloading of the elements 5A of the pole 5 it contains.

The presence of these technical characteristics in an information presentation device of the type comprising a sheet of material rolled onto a drum mounted on a base and a demountable pole intended to be raised up from this base in order to hold the sheet taut, renders it especially practical.

Equally remarkably:

the case 6 comprises a depression 11 for housing the slender piece 8 along its entire length, which depression opens into the wall of the case and contains the slot 7 for the passage of the sheet 2, the housing means 9 is located inside the case 6 and communicates with the depression 11 through the opening 10 which it comprises.

For this reason, the housing means 9 does not constitute any external projection on the wall of the case 6.

The external surface of the case is therefore independent from the presence of the means 9 for housing the pole element or elements.

Preferably and remarkably, the wall 6A of the case 6 behind which the housing means 9 is contained has, at a right angle to said means 9, a slot 12 which allows manual access to the pole elements 5A located there.

This characteristic allows the pole elements to be moved toward the loading-unloading opening in order to be extracted from the housing means 9 without any need to tilt the case 6 so as to displace them by gravity.

Preferably, the slot 12 is connected to the loading-unloading opening.

Preferably, the case 6 has at least two end surfaces 13, 14 each of which is disposed in a plane which is approximately vertical and inclined relative to the axis of the drum, so as to allow cases 6 to be juxtaposed like mitred pieces.

For this reason, several devices can be used to constitute a panel with a substantially curved surface (FIG. 3).

Remarkably, the base 4 of the device is locally constituted by the external surface of the wall of the case, precisely by two points 4A, 4B on this surface which are located underneath the case, each at one end of this case 6, and by two other points which are constituted at the ends of an elongated piece 15, which itself is mounted under the case 6 by a means 16 for its articulation around a substantially vertical axis 16A.

The means 16 for the articulation of the piece 15 allows it to articulate between at least two positions, including one position in which this piece 15 runs approximately parallel to the longitudinal axis 6A of the case and another in which it runs substantially perpendicular to this longitudinal axis 6A.

The case 6 has a means 17 for the demountable attachment of the pole 5 by its bottom, which means 17 is oriented in such a way that, when the base 4 of the case rests on a horizontal support, this means 17 maintains the pole inclined from the perpendicular of the location, at a value V such that its upper end is substantially perpendicular to the slot 7 for the passage of the sheet 2.

This characteristic makes it possible to compensate for the deviation in position which exists between the slot 7 and the demountable attachment means 17, due to the lateral space occupied by the drum, especially when it is carrying the sheet 2.

The means 17 consist, for example, of a simple lining in a shape complementary to that of the bottom of the pole.

What is claimed is:

1. An information presentation device (1) comprising a sheet (2) of material rolled onto a drum (3) mounted at least indirectly on a base (4), and a demountable pole (5) intended to be raised up from this base (4) for holding the sheet (2) taut between the drum (3) and a suspension point (5A) on the pole (5) at a distance from the base (4), the drum (3) being contained in a case (6), and on the one hand guided in rotation around a longitudinal axis (3A) relative to the base (4), and on the other hand, elastically stressed by a means (3B) for, elastically rolling said drum in a predetermined direction of rotation, so as to maintain the sheet (2) in traction so that said sheet can be rolled inside the case (6) through a longitudinal slot (7) in said case, said sheet being capable of passing through said longitudinal slot when being unrolled and when being rolled wherein said sheet comprises a lower edge which is secured at least indirectly to the drum (3), and an upper edge, along which extends a slender rigid member which, being particularly rectilinear and having a predetermined cross-section, is intended to be connected to the pole (5) at right angles at said suspension point, so as to allow the sheet (2) to be held taut between said suspension point (5A) and the drum (3), wherein the pole (5) is so constructed and arranged to be disassemblable such that said pole, when disassembled, comprises at least one element (SB) which has a length L equal to a fraction of a height H of said pole (5) in an assembled construction, said device further comprising:

said case (6) having means for housing said at least one element (5B) of the pole (5), said housing means (9) having an opening (10) for loading and unloading said at least one pole element, which opening (10) has a profile substantially greater than a cross-section of said at least one pole element, so as to allow said at least one pole element to pass through said opening, and wherein said housing means (9) is disposed relative to the case (6) in such a way that said opening (10) adjoins the longitudinal slot (7) for the passage of the sheet (2) and such that the slender rigid member (8) connected to and extending along the upper edge of said sheet (2), when said sheet is in a rolled position, at least partially closes the opening (10) of the housing means, to thereby prevent the removal of the at least one pole element, when said at least one pole element is disposed in said housing means.

2. The device according to claim 1, wherein the case (6) comprises a depression (11) for housing the slender member (8) along its entire length, which depression opens into a wall of the case and said depression contains the slot (7) for the passage of the sheet (2), and wherein the housing means (9) is disposed inside the case (6) and in communication with the depression (11) by way of said opening (10).

3. The device according to claim 1, wherein a wall portion (6A) of the case (6) behind which the housing means (9) is disposed has a cutout (12) which allows manual access to said at least one pole element (5A) located therein.

4. The device according to claim 3, wherein the slot (12) is connected to opening (10).

5. The device according to claim 1 wherein the case (6) has at least two end surfaces (13, 14) each of which is disposed in a plane which is approximately vertical and which is inclined relative to the longitudinal axis of the drum (3) so as to allow said case (6) to be juxtaposed with other like cases like mitred pieces.

6. The device according to claim 1 wherein its base (4) is locally constituted by the external surface of the wall of said case (6), precisely by two points (4A, 4B) of this surface which are located underneath the case (6), each at one of the ends of said case (6), and by two other points which are constituted at the ends of an elongated piece (15), which itself is mounted under the case (6) by means (16) for articulating said piece around a substantially vertical axis (16A).

7. The device according to claim 6, wherein the means (16) for articulating the piece (15) is so constructed and arranged to allow said piece to articulate between at least two positions, including a first position in which said piece (15) runs approximately parallel to the longitudinal axis (6A) of the case and a second position in which said piece runs substantially perpendicular to this longitudinal axis (6A).

8. The device according to claim 1 wherein said case (6) has means (17) for demountably attaching said pole (5) by its bottom, which means (17) is oriented in such a way that when the base (4) of the case rests on a horizontal support, said attaching means (17) maintain the pole (5) inclined from the perpendicular of said horizontal support, at a value V such that an upper end of said pole is disposed substantially vertically above slot (7) through which sheet (2) passes.

9. The device according to claim 1, wherein said suspension point (5A) on said pole is positioned at an upper edge of said pole.

* * * * *